(12) United States Patent
Hirade (10) Patent No.: US 6,411,814 B1
(45) Date of Patent: Jun. 25, 2002

(54) MOBILE COMMUNICATION SYSTEM CAPABLE OF QUICKLY RESPONDING A CALL SETUP REQUEST EVEN DURING CONTROL OF CALL CONGESTION IF A LAST CALL HAS BEEN INTERRUPTED BY A SQUELCH FUNCTION

(75) Inventor: Sei Hirade, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/455,620

(22) Filed: Dec. 7, 1999

(30) Foreign Application Priority Data

Dec. 8, 1998 (JP) ............................................. 10-348795

(51) Int. Cl.[7] ................................................. H04Q 7/38
(52) U.S. Cl. ....................... 455/510; 455/434; 455/455; 370/229; 370/447
(58) Field of Search ................................. 455/510, 517, 455/212, 218, 422, 455, 450, 434; 370/229, 230, 237, 447

(56) References Cited

U.S. PATENT DOCUMENTS 5,239,571 A * 8/1993 Takahashi ..................... 379/58
5,544,224 A * 8/1996 Jonsson et al. ................ 379/58

FOREIGN PATENT DOCUMENTS

JP 04373325 12/1992

* cited by examiner

*Primary Examiner*—Lee Nguyen
(74) *Attorney, Agent, or Firm*—Dickstein Shapiro Morin & Oshinsky LLP (57) ABSTRACT

Each mobile terminal comprises a memory which memorizes whether or not a last call end state is a squelch end and which memorizes, in case where the last call end state memorized in the memory is the squelch end, a random minimum value greater than that in case where the last call end state memorized in the memory is not the squelch end, a probability generating section, and a call setup request section responsive to a call setup request for detecting a call regulation value from a call regulation signal, supplying the random minimum value memorized in the memory to the probability generating section to make the probability generating section generate as a call setup request probability one of a plurality of random numbers within a range between the random minimum value and a random maximum value, and transmitting a call setup signal to a base station in case where the call setup request probability is greater than the call regulation value.

12 Claims, 7 Drawing Sheets

| LAST CALL END STATE | NORMAL END OR RESET STATE | SQUELCH END |
|---|---|---|
| RANDOM MINIMUM VALUE (L) | 0 | 50 |

MOBILE COMMUNICATION SYSTEM CAPABLE OF QUICKLY RESPONDING A CALL SETUP REQUEST EVEN DURING CONTROL OF CALL CONGESTION IF A LAST CALL HAS BEEN INTERRUPTED BY A SQUELCH FUNCTION

BACKGROUND OF THE INVENTION

This invention relates to a mobile communication system including a base station and a mobile station and, in particular, to a call congestion control method of controlling congestion of calls.

For example, a conventional call congestion control method is disclosed in Japanese Unexamined Patent Publication (JP-A) No. 04-373325 (373325/1992).

Figure 1:
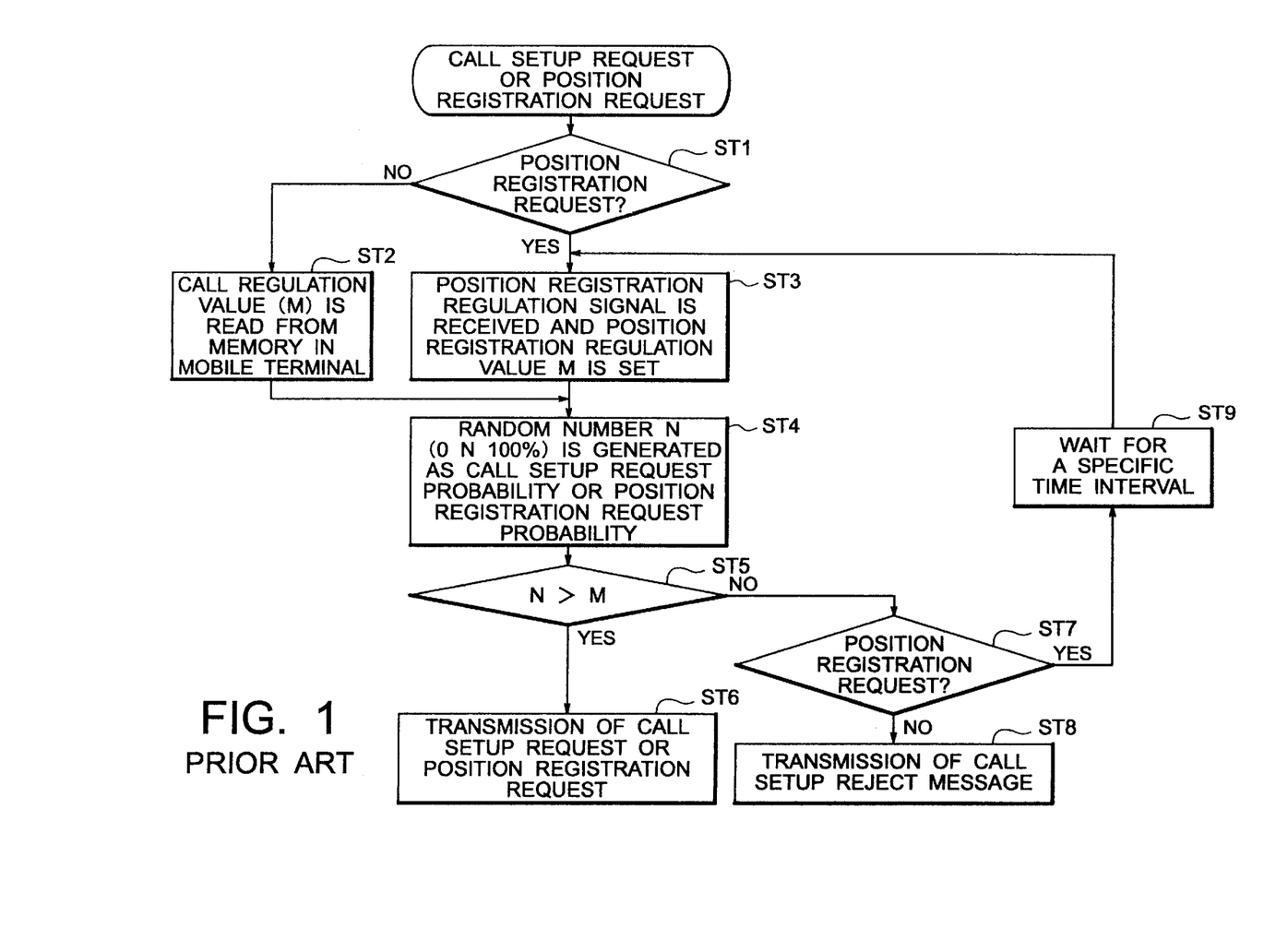
FIG. 1 is a flow chart for describing a conventional call congestion control method.

Referring to FIG. 1, operation of the call congestion control method will be described. In this method, a mobile terminal receives a call regulation signal supplied from a base station and monitors a call regulation value M represented by the call regulation signal to memorize the call regulation value M in a memory.

In FIG. 1, it is assumed that the mobile terminal receives a request signal while it is present within a regulated area under control of call congestion. Judgement is made about whether the request signal is a call setup request or a position registration request (step ST1). If the call setup request is received (No in step ST1), the call regulation value M is read from the memory in the mobile terminal (step ST2). Then, a random number N is generated in the mobile terminal (step ST4). Comparison is made between the call regulation value M and the random number N (step ST5). If the call regulation value M is smaller than the random number N (Yes in the step ST5), the mobile terminal transmits a call setup signal (step ST6). On the other hand, if the call regulation value M is not smaller than the random number N (No in the step ST5), the mobile terminal produces a call setup reject message (steps ST7 and ST8).

The call congestion control method described above, however, is disadvantageous in the following respect.

It is assumed that a last call has been undesiredly ended by squelch interruption resulting from a squelch function. It is noted here that the squelch function is a function of suppressing a noise by automatically inhibiting the operation of an amplifier of a receiver in absence of a signal input. In this event, the mobile terminal as a squelch-end mobile terminal will immediately produce another call setup request with a high probability in order to restart or continue a speech or conversation undesiredly interrupted. If the squelch-end mobile terminal is present within the regulated area, however, the call setup request from the squelch-end mobile terminal may be rejected for a long period of time, like a new call setup request produced by a new mobile terminal. Thus, it is not assured to restart and continue the speech undesiredly interrupted. It is noted here that the new mobile terminal is a terminal at which the last call is normally ended without being interrupted and that the new call setup request is a request independent from the last call.

This is because, in the conventional call congestion control method, any call setup request produced during control of call congestion is similarly dealt with, irrespective of whether the call setup request is produced by the squelch-end mobile terminal or the new mobile terminal. It will be noted here that the new call setup request is produced in case where the last call is normally ended without squelch interruption.

SUMMARY OF THE INVENTION

It is therefore an object of this invention to provide a mobile communication system which is capable of carrying out optimum call congestion control adapted to traffic characteristics and which is capable of accepting a call setup request from a mobile terminal in a short time even during control of call congestion if a last call is undesiredly ended by squelch interruption so as to assure continuation of an interrupted speech in the last call.

It is another object of this invention to provide a mobile terminal used in the above-mentioned mobile communication system.

According to this invention, there is provided a mobile communication system including a base station for transmitting a call regulation signal representative of a call regulation value and a plurality of mobile terminals responsive to the call regulation signal from the base station, each of the mobile terminals having a call setup request section for transmitting a call setup signal to the base station in response to a call setup request, wherein each of the mobile terminals comprises a memory which memorizes whether or not a last call end state of a last call at the mobile terminal is a squelch end by squelch interruption and which, in case where the last call end state memorized in the memory is the squelch end, memorizes as a memorized random minimum value a random minimum value having a value greater than that in case where the last call end state memorized in the memory is not the squelch end; and a probability generating section for generating as a call setup request probability one of a plurality of random numbers having values between a specified random minimum value and a random maximum value; the call setup request section of each mobile terminal comprising a first unit responsive to the call setup request for receiving the call regulation signal to detect the call regulation value from the call regulation signal; a second unit responsive to the call setup request for reading the memorized random minimum value from the memory as a readout random minimum value, supplying the probability generating section with the readout random minimum value as the specified random minimum value to make the probability generating section generate the call request probability; and a third unit for transmitting the call setup signal to the base station if the call setup request probability is greater than the call regulation value.

According to this invention, there is also provided a mobile terminal supplied from a base station with a call regulation signal representative of a call regulation value, the mobile terminal having a call setup request section for transmitting a call setup signal to the base station in response to a call setup request, wherein the mobile terminal comprises a memory which memorizes whether or not a last call end state of a last call at the mobile terminal is a squelch end by squelch interruption and which, in case where the last call end state memorized in the memory is the squelch end, memorizes as a memorized random minimum value a random minimum value having a value greater than that in case where the last call end state memorized in the memory is not the squelch end; and a probability generating section for generating as a call setup request probability one of a plurality of random numbers having values between a specified random minimum value and a random maximum value; the call setup request section comprising a first unit responsive to the call setup request for receiving the call regulation signal to detect the call regulation value from the call regulation signal; a second unit responsive to the call setup request for reading the memorized random minimum value from the memory as a readout random minimum value, supplying the probability generating section with the readout random minimum value as the specified random minimum value to make the probability generating section generate the call request probability; and a third unit for transmitting the call setup signal to the base station if the call setup request probability is greater than the call regulation value.

DESCRIPTION OF THE PREFERRED EMBODIMENTS

Now, description will be made about embodiments of this invention with reference to the drawing.

Figure 2:
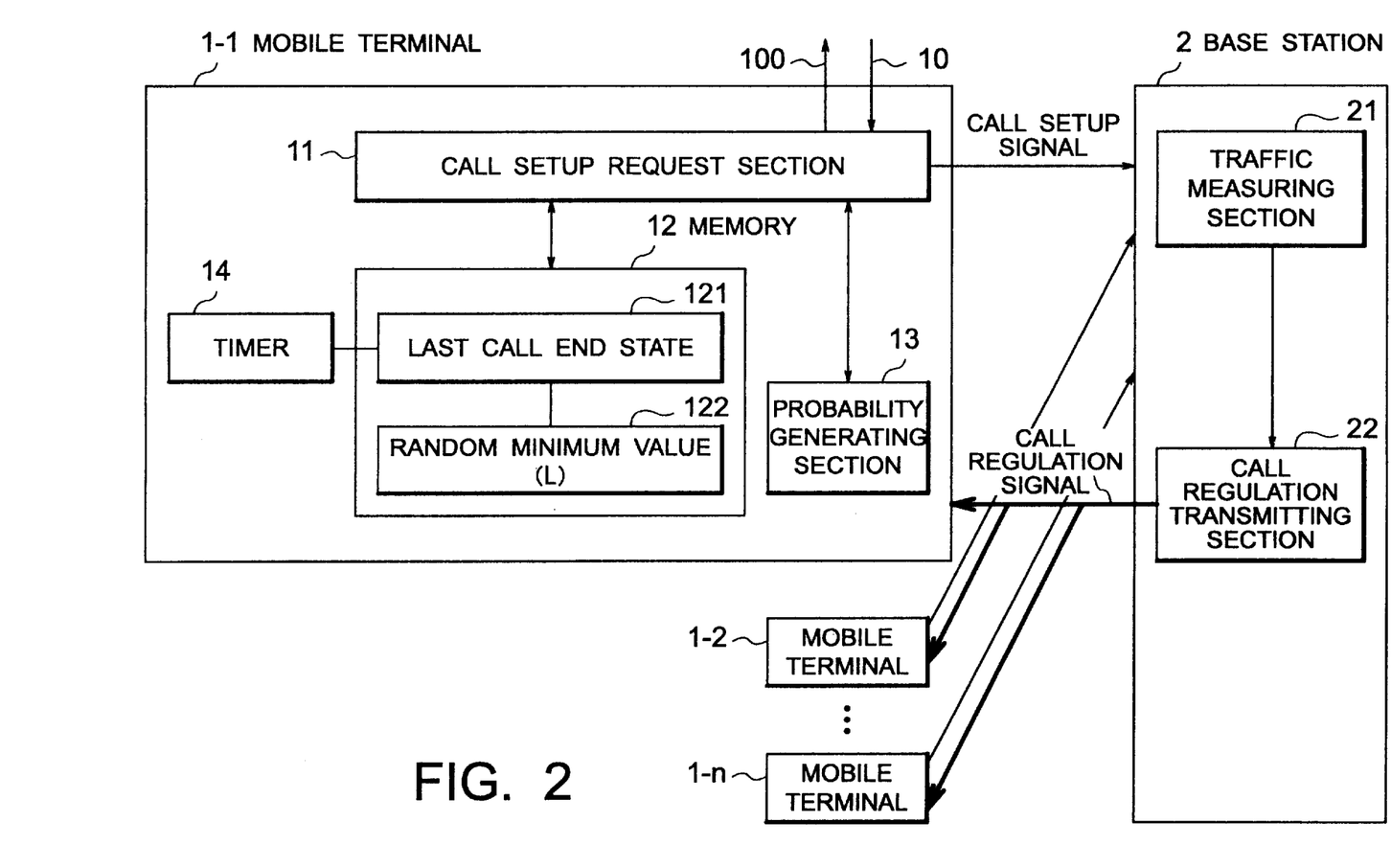
FIG. 2 is a block diagram of a mobile communication system according to a first embodiment of this invention.

Referring to FIG. 2, a mobile communication system according to a first embodiment of this invention includes a first through an n-th (n being an integer not smaller than 2) mobile terminals 1-1 through 1-n and a base station 2. Although the first mobile terminal 1-1 alone is illustrated in detail in the figure, each of the second through the n-th mobile terminals 1-2 through 1-n is similar in structure and function to the first mobile terminal 1-1.

The base station 2 receives call setup signals transmitted from the first through the n-th mobile terminals 1-1 through 1-n belonging thereto, and counts the number of the call setup signals received in every predetermined unit time interval as a traffic measurement which is continuously monitored. If the traffic measurement exceeds a preselected value, the base station 2 transmits to the first through the n-th mobile terminals 1-1 through 1-n a call regulation signal representative of a call regulation value M (%).

Upon reception of a call setup request 10, each of the first through the n-th mobile terminals 1-1 through 1-n receives the call regulation signal and detects the call regulation value M (%) from the call regulation signal. Then, each of the first through the n-th mobile terminals 1-1 through 1-n reads a last call end state 121 from a memory 12 and reads a random minimum value L (%) 122 corresponding to the last call end state 121. The random minimum value L (%) 122 is used when a probability generating section 13 generates a call setup request probability N (%) which is a random number within a range between the random minimum value L (%) and a random maximum value of 100 (%).

The random minimum value L (%) 122 is determined in dependence upon the last call end state 121 as described above. Specifically, if the last call end state 121 is a squelch end by squelch interruption, the random minimum value L (%) 122 is determined to be a great value so that the call setup request probability N (%) is greater than the call regulation value M (%) with a high probability as compared with the case where the last call end state 121 is not the squelch end. In other words, the call setup request probability N (%) will have a greater value in a mobile terminal at which a last call has a squelch end by squelch interruption and a call setup request is presumably produced in order to restart or continue an interrupted speech in the last call. On the other hand, the call setup request probability N (%) will have a smaller value in a mobile terminal at which a last call does not have the squelch end by the squelch interruption and a call setup request is produced in order to start a new speech independent from the last call. For the brevity of description, the former and the latter mobile terminals will hereafter be referred to as a squelch-end mobile terminal and a normal-end mobile terminal, respectively.

Once the random minimum value L (%) 122 is determined, each of the first through the n-th mobile terminals 1-1 through 1-n activates the probability generating section 13 as a random number generator in each of the first through the n-th the mobile terminals 1-1 through 1-n to obtain the call setup request probability N (%). Each of the first through the n-th mobile terminals 1-1 through 1-n transmits a call setup signal when the call setup request probability N (%) is greater than the call regulation value M (%). When the call setup request probability N (%) is not greater than the call regulation value M (%), each of the first through the n-th mobile terminals 1-1 through 1-n produces a call setup reject message 100 without transmitting the call setup signal.

Thus, in dealing with the call setup request produced during control of call congestion, the random minimum value L (%) for the call setup request probability N (%) is different between the squelch-end mobile terminal and the normal-end mobile terminal. It is consequently possible to assure continuation of the interrupted speech at the squelch-end mobile terminal.

Referring to FIG. 2, the mobile communication system will be described more in detail.

The base station 2 comprises a traffic measuring section 21 and a call regulation transmitting section 22.

The traffic measuring section 21 receives the call setup signals transmitted from the first through the n-th mobile terminals 1-1 through 1-n, and counts the number of the call setup signals received in every predetermined unit time interval as the traffic measurement which is continuously monitored.

If the traffic measurement exceeds the preselected value, the call regulation transmitting section 22 transmits to the first through the n-th mobile terminals 1-1 through 1-n the call regulation signal representative of the call regulation value M (%) in order to suppress occurrence of call congestion.

Each of the first through the n-th mobile terminals 1-1 through 1-n has a call setup request section 11, the memory 12, the probability generating section 13, and a timer 14. Although description will hereinafter be made about the first mobile terminal 1-1 alone, each of the second through the n-th mobile terminals 1-2 through 1-n is similar in function to the first mobile terminal 1-1.

Upon reception of the call setup request 10, the call setup request section 11 receives the call regulation signal from the base station 2 and detects the call regulation value M (%)

from the call regulation signal. Then, the call setup request section 11 reads the last call end state 121 from the memory 12 and reads the random minimum value L (%) 122 corresponding to the last call end state 121.

Once the random minimum value L (%) 122 is determined, the call setup request section 11 activates the probability generating section 13 as a random number generator to obtain the call setup request probability N (%). The call setup request section 11 transmits the call setup signal when the call setup request probability N (%) is greater than the call regulation value M (%). When the call setup request probability N (%) is not greater than the call regulation value M (%), the call setup request section 11 produces the call setup reject message 100 without transmitting the call setup signal.

The memory 12 memorizes the last call end state 121 and the random minimum value L (%) 122 corresponding to the last call end state 121. The random minimum value L (%) 122 is assigned with different values in dependence upon the last call end state 121. Specifically, if the last call end state 121 is the squelch end by the squelch interruption, the random minimum value L (%) 122 is determined to be a greater value so that the call setup request probability N (%) is greater than the call regulation value M (%) with a high probability as compared with the case where the last call end state 121 is not the squelch end, as described above.

The probability generating section 13 is activated by the call setup request section 11 given the value of the random minimum value L (%) 122 and produces the call setup request probability N (%) as a random number within a range between the random minimum value L (%) 122 and the random maximum value of 100 (%).

When the last call end state 121 representing the squelch end by the squelch interruption is memorized in the memory 12 together with the random minimum value L (%) 122 having a value (for example, 50) corresponding to the squelch end, the timer 14 is started. In absence of another call setup request within a predetermined time period (for example, 5 minutes), the last call end state 121 in the memory 12 is put into a reset state and the value of the random minimum value L (%) is cleared into zero.

Likewise, when the last call end state 121 representing a normal end without the squelch interruption is memorized in the memory 12 together with the random minimum value L (%) 122 having a value (for example, 0) corresponding to the normal end, the timer 14 is started. In absence of another call setup request within the predetermined time period (for example, 5 minutes), the last call end state 121 (representing the normal end in this case) in the memory 12 is put into the reset state and the value of the random minimum value L (%) is kept equal to zero.

Next referring to FIG. 3, description will be made in detail about an operation of the mobile communication system illustrated in FIG. 2.

By way of example, consideration will be made about the first mobile terminal 1-1. Upon reception of the call setup request 10, the first mobile terminal 1-1 receives the call regulation signal supplied from the base station 2 and detects the call regulation value M (%) if control or regulation of call congestion is active (step S1).

Figure 4:
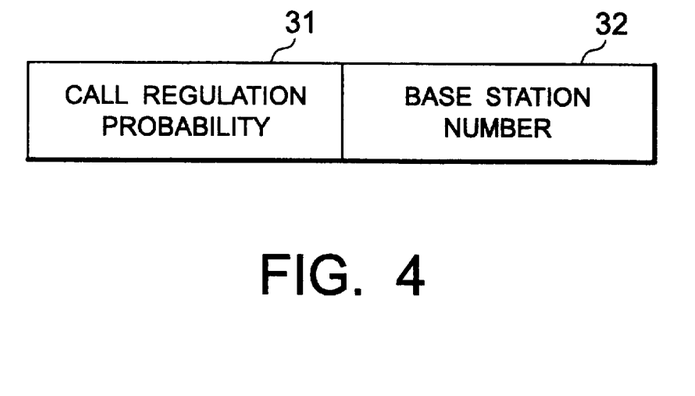
FIG. 4 is a view for describing a call regulation signal used in the mobile communication system illustrated in FIG. 2.

Temporarily referring to FIG. 4, the call regulation signal comprises a call regulation value indicating portion 31 representative of a call regulation probability as the call regulation value M (%) and a base station number indicating portion 32 representative of a base station number assigned to the base station 2. The call regulation value indicating portion 31 is given a particular pattern representative of no regulation when the control of call congestion is inactive. Otherwise, the call regulation value indicating portion 31 is given the call regulation probability, as described above.

Turning back to FIG. 3, the call setup request section 11 reads the last call end state 121 from the memory 12 in the first mobile terminal 1-1 (step S2) and reads the random minimum value L (%) 122 corresponding to the last call end state 121 (step S3).

Figure 5:
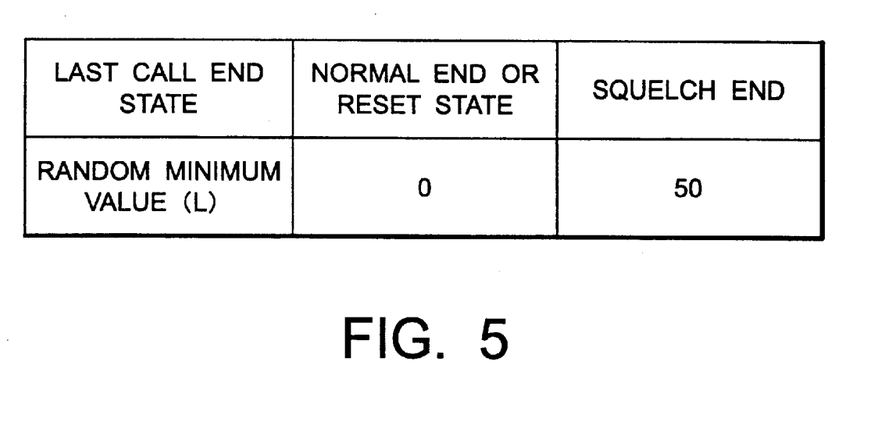
FIG. 5 is a view for describing an operation of a memory of each mobile terminal in the mobile communication system illustrated in FIG. 2.

Temporarily referring to FIG. 5, the random minimum value L (%) 122 is given different values corresponding to the last call end state 121. In the illustrated example, the random minimum value L (%) 122 memorized in the memory 12 is equal to 50 when the squelch end by the squelch interruption is memorized in the memory 12 as the last call end state 121. On the other hand, when the normal end without the squelch interruption is memorized in the memory 12 as the last call end state 121, the random minimum value L (%) memorized in the memory 12 is equal to 0. Thus, the random minimum value L (%) 122 in the memory 12 in case where the squelch end is memorized in the memory 12 is greater than that in case where the normal end is memorized in the memory 12. The squelch end memorized in the memory 12 as the last call end state 121 is erased in absence of another call setup request within the predetermined time period starting from the time instant when the squelch end is memorized. Thus, the last call end state 121 is put into the reset state and the random minimum value L (%) of 50 is cleared into 0.

Once the random minimum value L (%) 122 is determined, the call setup request section 11 makes the probability generating section 13 as a random number generator generate the call setup request probability N (%) as a random number within a range between the random minimum value L (%) and the random maximum value of 100 (%) (step S4). As described above, the random minimum value L (%) 122 in case where the squelch end is memorized in the memory 12 is greater than that in case where the normal end is memorized in the memory 12. Therefore, if the last call end state 121 is the squelch end, the call setup request probability N (%) is greater than the call regulation value M (%) with a high probability as compared with the case where the last call end state 121 is not the squelch end but the normal end, i.e., a current call setup request is a new request independent from the last call.

The call setup request section 11 compares the call setup request probability N (%) and the call regulation value M (%) (step S5). When the call setup request probability N (%) is greater than the call regulation value M (%), the call setup request section 11 transmits the call setup signal (step S6). On the other hand, when the call setup request probability N (%) is not greater than the call regulation value M (%), the call setup request section 11 produces the call setup reject message 100 (step S14).

If the call setup signal is transmitted in the step S6, communication is started, i.e., a communication state is established (step S7). Thereafter, when the communication is ended, i.e., the communication state is turned into a call end state (step S8), the call setup request section 11 makes the memory 12 memorize the call end state as the last call end state 121 together with the random minimum value L (%) 122 as described in conjunction with FIG. 3 (step S9).

When the last call end state 121 is memorized in the memory 12 in the step S9, the timer 14 is started (step S10) to monitor whether or not another call setup request is produced within the predetermined time period (for example, 5 minutes) (steps S11, S12). In absence of another call setup request within the predetermined time period (No in the step S11 and Yes in the step S12), the last call end state 121 in the memory 12 is put into the reset state and the random minimum value L (%) 122 is cleared into 0 (step S13). On the other hand, in presence of another call setup request within the predetermined time period after the timer 14 is started, the operation returns to the step S1.

Next referring to FIG. 6, description will be made about a specific example of the operation of the first mobile terminal 1-1 in the mobile communication system illustrated in FIG. 2.

Figure 6:
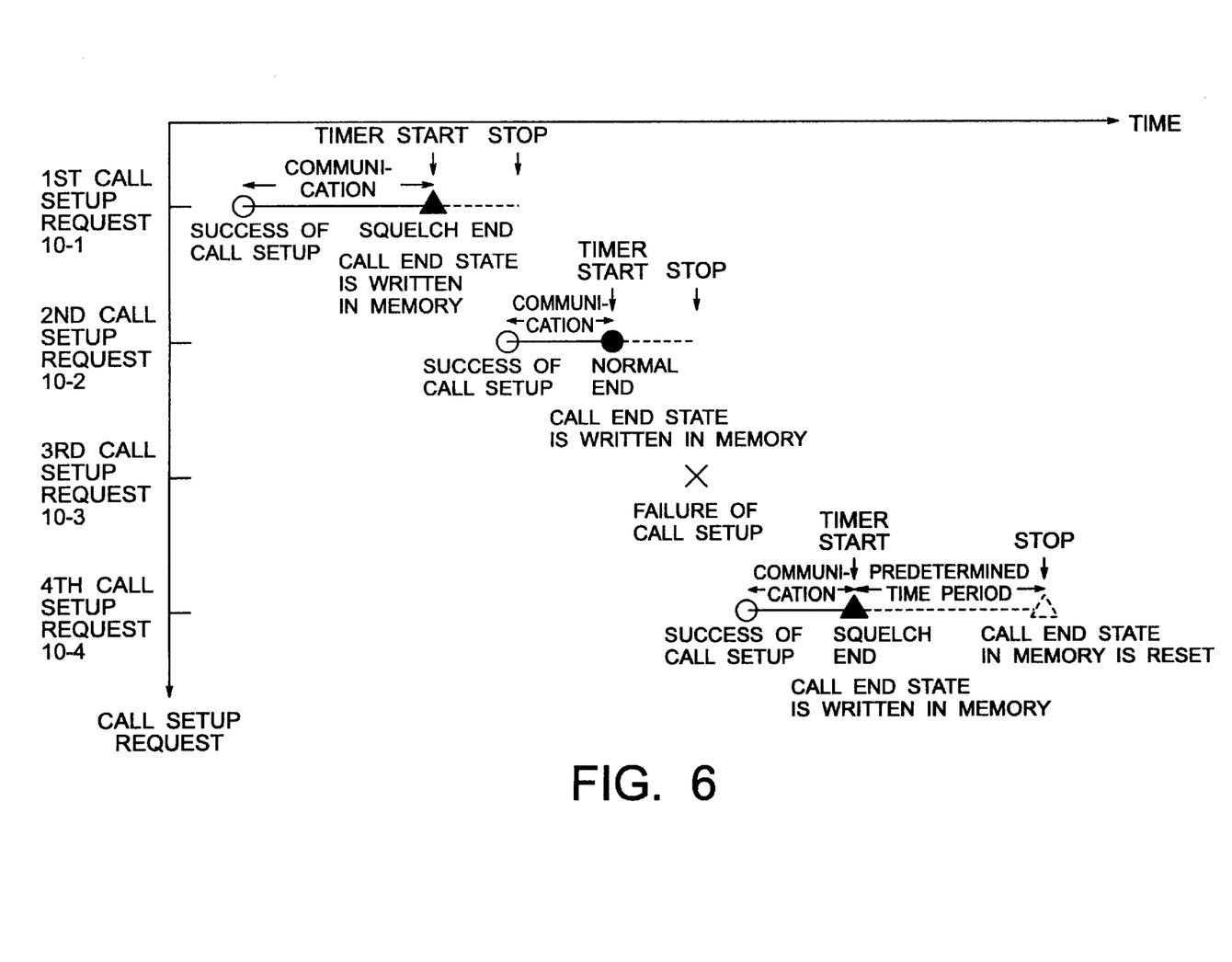
FIG. 6 is a view for describing a specific example of an operation of the mobile terminal in the mobile communication system illustrated in FIG. 2.

In FIG. 6, the state of the mobile terminal 1-1 is illustrated. In the figure, the abscissa and the coordinate represent the lapse of time and a plurality of call setup requests arranged in the order of production, respectively.

Figure 3:
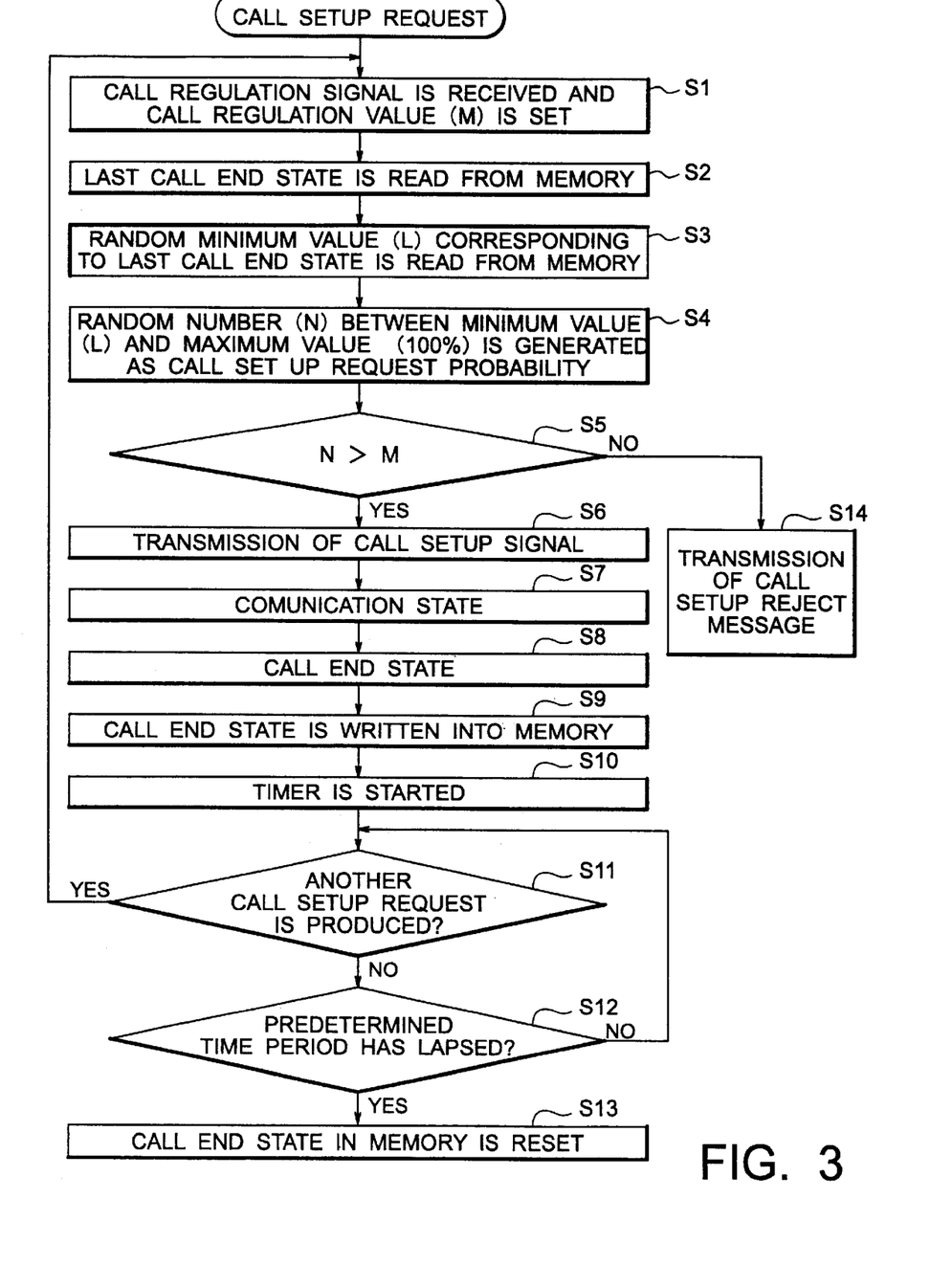
FIG. 3 is a flow chart for describing an operation of the mobile communication system illustrated in FIG. 2.

It is assumed that a first call setup request 10-1 is successful (steps S1 through S6 in FIG. 3) to start the communication (step S7 in FIG. 3) and that the communication is ended by the squelch interruption (step S8 in FIG. 3). In this event, the squelch end (squelch interruption) in FIG. 5 is written in the memory 12 as the last call end state 121 (step S9 in FIG. 3) and the value of 50 in FIG. 5 is written in the memory 12 as the random minimum value L (%) 122. Once the squelch end (squelch interruption) is written in the memory 12 as the last call end state 121, the timer 14 is started (step S10 in FIG. 3).

If another call setup request is produced as a second call setup request 10-2 within the predetermined time period monitored by the timer 14 (Yes in step S11 in FIG. 3), the call setup request section 11 reads the last call end state 121 from the memory 12 (step S2 in FIG. 3) and reads the random minimum value L (%) 122 from the memory 12 (step S3 in FIG. 3). Since the last call end state 121 is the squelch end (squelch interruption), the call setup request section 11 makes the probability generating section 13 generate the call setup request probability N (%) having a value within a range between the random minimum value L=50 (%) and the random maximum value of 100 (%) (step S4 in FIG. 3). The call setup request probability N (%) is compared with the call regulation value M (%) (step S5 in FIG. 3). With respect to the second call setup request 10-2, it is assumed that the call setup request probability N (%) is greater than the call regulation value M (%). Therefore, the call setup signal is transmitted (step S6 in FIG. 3) to establish the communication state (step S7 in FIG. 3). The communication state proceeds to the call end state which is the normal end (step S8 in FIG. 3). The normal end in FIG. 5 is written in the memory 12 as the last call end state 121 (step S9 in FIG. 3) and the value of 0 in FIG. 5 is written in the memory 12 as the random minimum value L (%) 122. When the normal end is written in the memory 12 as the last call end state 121, the timer 14 is started (step S10 in FIG. 3).

If another call setup request is produced as a third call setup request 10-3 within the predetermined time period monitored by the timer 14 (Yes in step S11 in FIG. 3), the call setup request section 11 reads the last call end state 121 from the memory 12 (step S2 in FIG. 3) and reads the random minimum value L (%) 122 from the memory 12 (step S3 in FIG. 3). Since the last call end state 121 is the normal end, the call setup request section 11 makes the probability generating section 13 generate the call setup request probability N (%) having a value within a range between the random minimum value L=0 (%) and the random maximum value of 100 (%) (step S4 in FIG. 3). The call setup request probability N (%) is compared with the call regulation value M (%) (step S5 in FIG. 3). With respect to third call setup request 10-3, it is assumed that the call setup request probability N (%) is smaller than the call regulation value M (%). Therefore, the third call setup request is unsuccessful and the call setup reject message 100 is produced (step S14 in FIG. 3).

Like the first call setup request 10-1, it is assumed that a fourth call setup request 10-4 is successful (steps S1 through S6 in FIG. 3) to start the communication (step S7 in FIG. 3) and that the communication is ended by the squelch interruption (step Se in FIG. 3). In this case also, the squelch end (squelch interruption) in FIG. 5 is written in the memory 12 as the last call end state 121 (step S9 in FIG. 3) and the value of 50 in FIG. 5 is written in the memory 12 as the random minimum value L (%) 122, in the manner similar to the first call setup request 10-1. Once the squelch end (squelch interruption) is written in the memory 12 as the last call end state 121, the timer 14 is started (step S10 in FIG. 3).

If another call setup request is not produced within the predetermined time period monitored by the timer 14 (No in step S11 and Yes in Step S12 in FIG. 3), the last call end state 121 in the memory 12 is put into the reset state (step S13 in FIG. 3).

Figure 7:
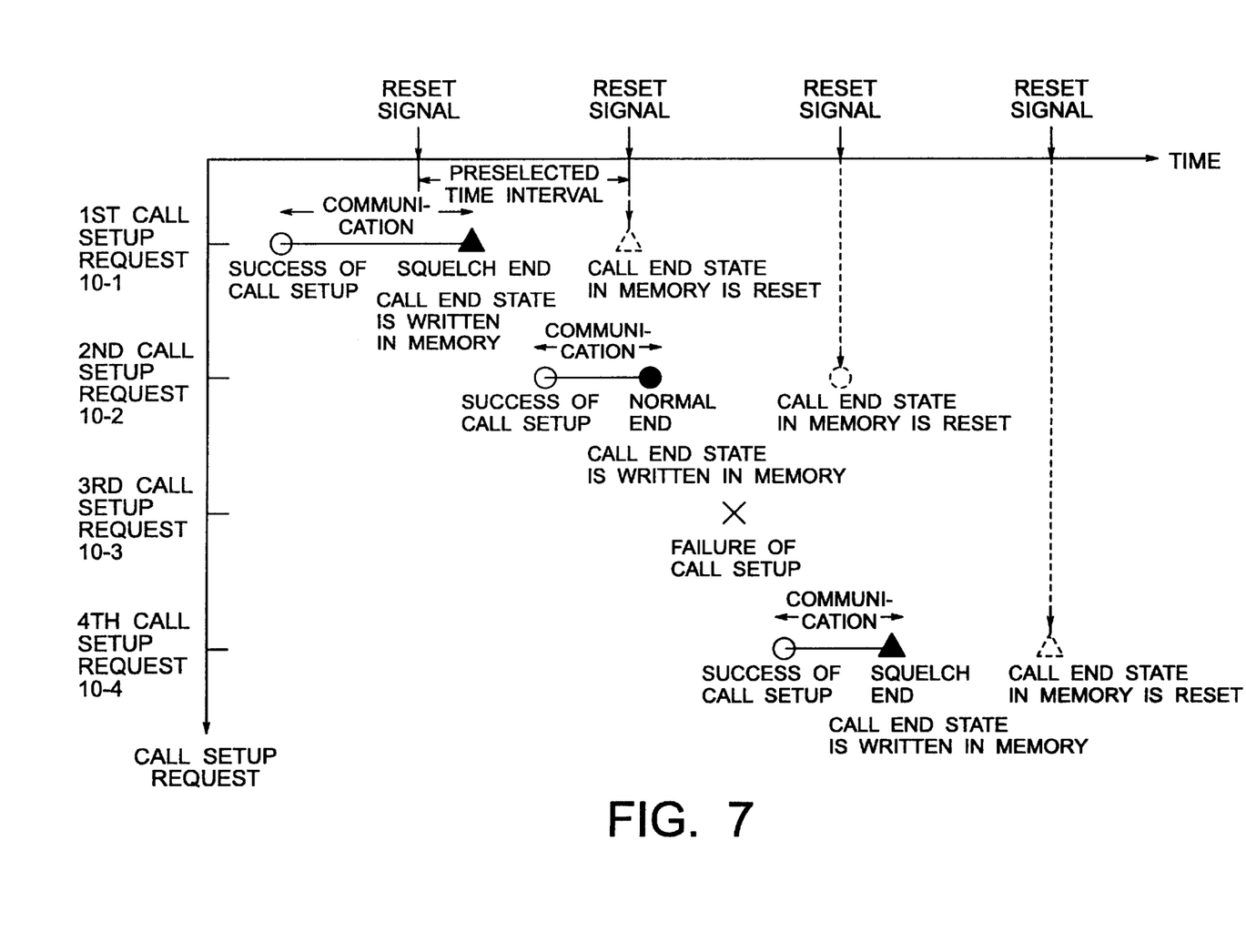
FIG. 7 is a view for describing another specific example of the operation of the mobile terminal in the mobile communication system illustrated in FIG. 2.

Referring to FIG. 7, description will be made about another specific example of the operation of the first mobile terminal 1-1 in the mobile communication system illustrated in FIG. 2. The illustrated example is similar to the example in FIG. 6 except that the last call end state 121 in the memory 12 is put into the reset state in response to a reset signal which is a timing signal produced at a preselected time interval.

Figure 8:
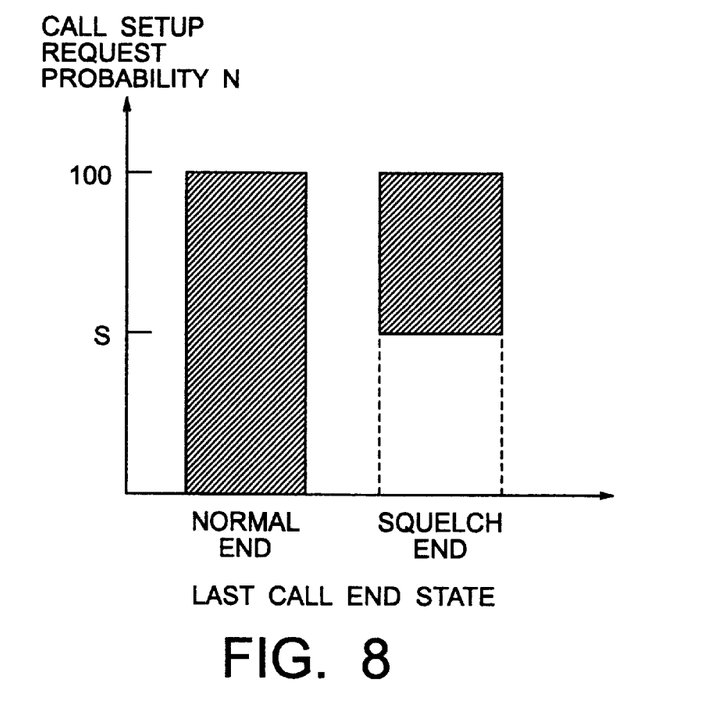
FIG. 8 is a view for describing an operation of a mobile communication system according to a second embodiment of this invention.
Figure 9:
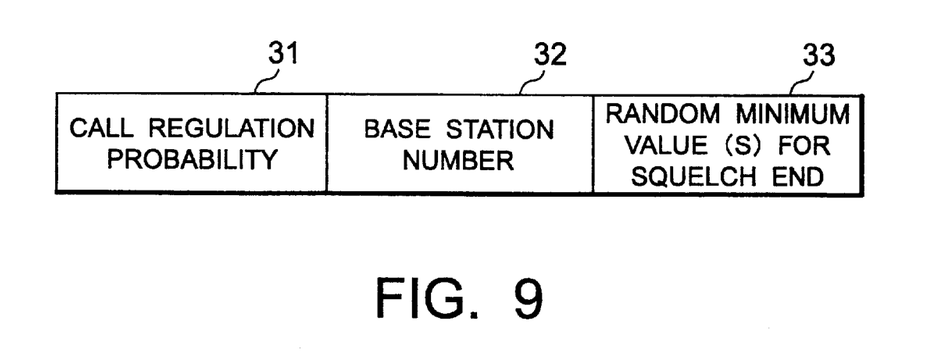
FIG. 9 is a view for describing a call regulation signal used in the mobile communication system illustrated in FIG. 8.

Referring to FIGS. 8 and 9 in addition to FIG. 2, a mobile communication system according to a second embodiment will be described.

Referring to FIG. 8, the call setup request probability N (%) has a range depending upon the last call end state 121 memorized in the memory 12 of each mobile terminal in the mobile communication system illustrated in FIG. 2. A value S is a squelch-end random minimum value in case where the last call end state 121 is the squelch end by the squelch interruption. In case where the last call end state 121 is the squelch end, the call setup request probability N (%) is produced within a range between the squelch-end random minimum value S (%) and the random maximum value 100 (%). In this event, the call setup request probability N (%) is greater than the call regulation value M (%) with a high probability as compared with the case where the last call end state 121 is the normal end. In the first embodiment, the random minimum value L (%) is fixedly determined as L=50 (%) in correspondence to the squelch end.

In the second embodiment, the squelch-end random minimum value S is detected from the call regulation signal supplied from the base station 2. Thus, the squelch-end random minimum value S is dynamically varied in response to the traffic. Referring to FIG. 9, the call regulation signal comprises the call setup regulation probability indicating portion 31, the base station number indicating portion 32, and a squelch-end random minimum value indicating portion 33 representative of the squelch-end random minimum value S. As described above, the call regulation probability indicating portion 31 indicates the particular pattern representative of no regulation when the control of call congestion is inactive. Otherwise, the call regulation value indicating portion 31 is given the call regulation probability. Likewise, the squelch-end random minimum value indicating portion 33 is given a specific pattern representative of no regulation when the control of call congestion is inactive. Otherwise, the squelch-end random minimum value indicating portion 33 is given the squelch-end random minimum value S.

Alternatively, the squelch-end random minimum value S may be determined within the mobile terminal in correspondence to the call regulation value M.

The mobile communication system according to this invention is advantageous in the following respects.

At first, it is possible to carry out optimum call congestion control adapted to the traffic characteristics.

This is because, in the system where the mobile terminal receives the call regulation signal from the base station and, when the call setup request is produced while the mobile terminal is present within the regulated area, compares the call setup request probability N as a random number generated in the mobile terminal itself and the call regulation value M supplied from the base station to judge whether or not the call setup request is accepted, the call regulation value M supplied from the base station is dynamically varied in response to the traffic characteristics.

Second, in case where the last call is ended by the squelch interruption at a particular mobile terminal, another call setup request by the particular mobile terminal is accepted in a short time even when the control of call congestion is active. Thus, it is possible to assure continuation of the interrupted speech in the last call by the particular mobile terminal.

This is because, in dealing with the call setup request while the control of call congestion is active, the random minimum value L for the call setup request probability N is different between the case where the last call end state is the squelch end and the case where the last call end state is not the squelch end. Thus, in case where the last call end state is the squelch end by the squelch interruption, the call setup request probability N is greater than the call regulation value M with a high probability as compared with the case where the last call end state is not the squelch end.

What is claimed is:

1. A mobile communication system including a base station for transmitting a call regulation signal representative of a call regulation value and a plurality of mobile terminals responsive to the call regulation signal from said base station, each of said mobile terminals having a call setup request section for transmitting a call setup signal to said base station in response to a call setup request, wherein:

each of said mobile terminals comprises:

a memory which memorizes whether or not a last call end state of a last call at said mobile terminal is a squelch end by squelch interruption and which, in case where the last call end state memorized in said memory is the squelch end, memorizes as a memorized random minimum value a random minimum value having a value greater than that in case where the last call end state memorized in said memory is not the squelch end; and a probability generating section for generating as a call setup request probability one of a plurality of random numbers having values between a specified random minimum value and a random maximum value;

said call setup request section of each mobile terminal comprising:

a first unit responsive to the call setup request for receiving the call regulation signal to detect the call regulation value from the call regulation signal;

a second unit responsive to the call setup request for reading the memorized random minimum value from said memory as a readout random minimum value, supplying said probability generating section with the readout random minimum value as the specified random minimum value to make said probability generating section generate the call request probability; and a third unit for transmitting the call setup signal to said base station if the call setup request probability is greater than the call regulation value.

2. A mobile communication system as claimed in claim 1, wherein:

said memory in each mobile terminal memorizes whether the last call end state of said mobile terminal is the squelch end by the squelch interruption or a normal end without the squelch interruption and, in case where the squelch end is memorized as the last call end state, memorizes as the memorized random minimum value the random minimum value having a value greater than that in case where the normal end is memorized as the last call end state.

3. A mobile communication system as claimed in claim 1, wherein:

said call setup request section in each mobile terminal further comprises means for producing a call setup reject message without transmitting the call setup signal in case where the call setup request probability is smaller than the call regulation value.

4. A mobile communication system as claimed in claim 1, wherein:

said call setup request section in each mobile terminal further comprises a fourth unit for making, when communication at said mobile terminal is ended, said memory memorizes whether or not the last call end state is the squelch end and for making, in case where the last call end state memorized in said memory is the squelch end, said memory memorizes as the memorized random minimum value the random minimum value greater than that in case where the last call end state memorized in the memory is not the squelch end.

5. A mobile communication system as claimed in claim 4, wherein:

said call setup request section in each mobile terminal further comprises a fifth unit for making, if another call setup request is not received within a predetermined time period after the squelch end is memorized as the last call end state, said memory memorizes that the last call end state is not the squelch end and memorizes as the memorized random minimum value the random minimum value corresponding to the last call end state which is not the squelch end.

6. A mobile communication system as claimed in claim 5, wherein:

said fifth unit in said call setup request section of each mobile terminal brings said memory into a reset state as an operation of making said memory memorize that the last call end state is not the squelch end.

7. A mobile terminal supplied from a base station with a call regulation signal representative of a call regulation value, said mobile terminal having a call setup request section for transmitting a call setup signal to said base station in response to a call setup request, wherein:

said mobile terminal comprises:

a memory which memorizes whether or not a last call end state of a last call at said mobile terminal is a squelch end by squelch interruption and which, in case where the last call end state memorized in said memory is the squelch end, memorizes as a memorized random minimum value a random minimum value having a value greater than that in case where the last call end state memorized in said memory is not the squelch end; and a probability generating section for generating as a call setup request probability one of a plurality of random numbers having values between a specified random minimum value and a random maximum value;

said call setup request section comprising:

a first unit responsive to the call setup request for receiving the call regulation signal to detect the call regulation value from the call regulation signal;

a second unit responsive to the call setup request for reading the memorized random minimum value from said memory as a readout random minimum value, supplying said probability generating section with the readout random minimum value as the specified random minimum value to make said probability generating section generate the call request probability; and a third unit for transmitting the call setup signal to said base station if the call setup request probability is greater than the call regulation value.

8. A mobile terminal as claimed in claim 7, wherein:

said memory memorizes whether the last call end state of said mobile terminal is the squelch end by the squelch interruption or a normal end without the squelch interruption and, in case where the squelch end is memorized as the last call end state, memorizes as the memorized random minimum value the random minimum value having a value greater than that in case where the normal end is memorized as the last call end state.

9. A mobile terminal as claimed in claim 7, wherein:

said call setup request section further comprises means for producing a call setup reject message without transmitting the call setup signal in case where the call setup request probability is smaller than the call regulation value.

10. A mobile terminal as claimed in claim 7, wherein:

said call setup request section further comprises a fourth unit for making, when communication at said mobile terminal is ended, said memory memorizes whether or not the last call end state is the squelch end and for making, in case where the last call end state memorized in said memory is the squelch end, said memory memorizes as the memorized random minimum value the random minimum value greater than that in case where the last call end state memorized in the memory is not the squelch end.

11. A mobile terminal as claimed in claim 10, wherein:

said call setup request section further comprises a fifth unit for making, if another call setup request is not received within a predetermined time period after the squelch end is memorized as the last call end state, said memory memorize that the last call end state is not the valve end and memorize as the memorized random minimum value the random minimum value corresponding to the last call end state which is not the squelch end.

12. A mobile terminal as claimed in claim 11, wherein:

said fifth unit of said call setup request section brings said memory into a reset state as an operation of making said memory memorize that the last call end state is not the squelch end.

* * * * *